(No Model.)
G. F. OEHMEN.
UNISON DEVICE.
No. 404,426. Patented June 4, 1889.
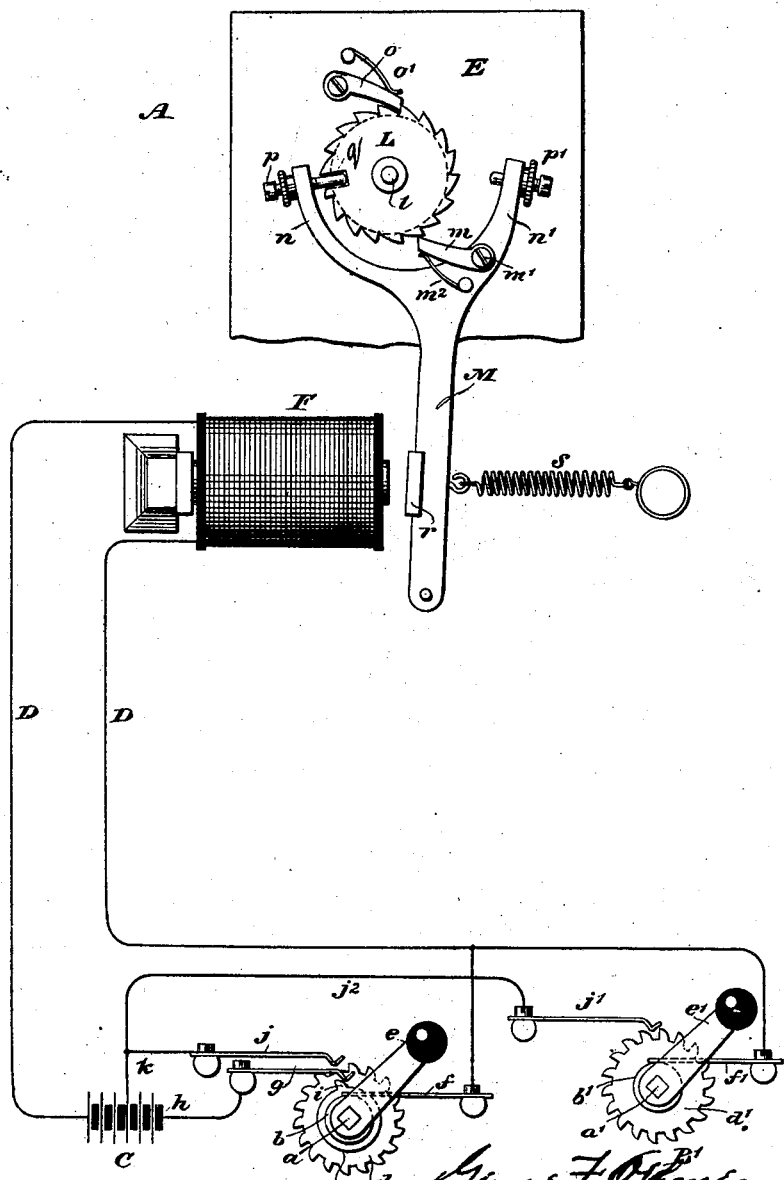
Witnesses.
Geo. W. Breck.
Eugene J. Reilly.
George F. Oehmen
Inventor,
By Charles J. Judson
his Attorney

UNITED STATES PATENT OFFICE.

GEORGE F. OEHMEN, OF NEW YORK, N. Y.

UNISON DEVICE.

SPECIFICATION forming part of Letters Patent No. 404,426, dated June 4, 1889.

Application filed June 16, 1888. Serial No. 277,372. (No model.)

*To all whom it may concern:*

Be it known that I, GEORGE F. OEHMEN, of the city, county, and State of New York, have made new and useful Improvements in Unison Devices, of which the following is a specification.

My improvement has reference to that class of instruments used or operated electrically from a sending-station by a step-by-step movement imparted by a transmitter in the usual way, and where synchronism of motion between the sending and receiving stations is an essential element.

The complete improvement consists, first, in having at the receiving-stations a slot or notch at zero or the unison-point on the escapement-wheel adapted to receive an elongated pin secured to the escapement-lever. When in its revolution the slot on the escapement-wheel arrives opposite this pin, the armature of the controlling-magnet is permitted to recede from the core of the magnet to such a distance that under the normal strength of battery the armature will be out of the field of magnetic influence, and therefore cannot withdraw the pin from the slot; but when an increase of battery-power is sent over the line sufficient to attract the armature of the controlling-magnet the pins in all the escapement-wheels throughout the circuit will be simultaneously withdrawn from the slots, and the escapement-wheels will thus start in unison with the transmitter at the central station.

My invention also consists in certain arrangement of parts at the sending-station in connection with the transmitter and batteries, by means of which the strength of the current sent over the line to the operating-magnets of the several stations is regulated.

In order that my invention may be more fully understood, I will make use of the accompanying drawing, showing a front elevation of the instruments at the sending and receiving stations, in which A represents the receiving-station and B the central or transmitting station. With the latter are the necessary batteries and connections for the proper working of my invention.

In the drawing, $a$ is the shaft of the transmitter, to which is rigidly attached the wheels $b\ c\ d$. This shaft also has a crank-handle $e$ for the purpose of rotating the shaft.

$f$ is a spring constantly resting upon the surface of the wheel $b$.

$g$ is a contact-spring connected to the full battery C at point $h$. This spring $g$ engages with the single tooth $i$, which is on wheel $b$.

$j$ is another contact-spring intended for engagement with the teeth of wheel $d$, and connected to one-half of battery C at the point $k$. At B' is another transmitter, which is used to bring all the wheels in the circuit in unison with the transmitter B. This transmitter B' has a shaft $a'$, to which is also rigidly attached the disk or wheel $b'$ and the toothed wheel $d'$. This toothed wheel has as many teeth or circuit making and breaking points as there are teeth in the escapement-wheel L at the several sub-stations. Transmitter B' also has a crank-handle $e'$ for the purpose of rotating these disks or wheels.

$f'$ is a contact-spring constantly resting upon the surface of the wheel $b'$ and connected to the line D. $j'$ is another contact-spring arranged to make contact with the teeth of the break-wheel $d'$, and connected by wire $j^2$ to half the battery C at the point $k$.

D is the line-wire to and from the outlying stations A. At station A, L is a ratchet-wheel mounted upon the shaft $l$.

$n$ and $n'$ are branches of the armature M. Secured to branch $n'$ is the ratchet-pawl $m$, by means of the screw $m'$.

$m^2$ is a spring-piece holding the pawl $m$ in contact with teeth of wheel L. Secured to the frame E is the dog $o$ and spring $o'$, holding the dog into a tooth of wheel L, so that the wheel L cannot move backward. Pawl $p'$ is an adjustable set-screw controlling the ordinary distance of vibration of the lever M.

$q$ is a slot into which the set-screw $p$ falls for purposes hereinafter to be described.

F is an electro-magnet controlling the motion of the lever-extension M of the armature $r$, to which it is securely fastened. S is a retractile spring attached to the lever M, acting to withdraw the lever from the magnet wherever the current is broken.

The operation of the invention, as a whole, is as follows: Whenever the outlying stations are to be operated, in order to insure correspondence between stations A and the central station B, the operator at the central station first operates transmitter B' by turning the crank-handle e' at least one complete revolution. This will cause as many makes and breaks of the current as there are separate contact-points in the wheel d'. By the action of the pawl m upon the escapement-wheel L this wheel will be rotated step by step until the slot q coming opposite the pin p the latter will fall into the slot q by the retractile action of the spring S. This will carry the armature r beyond its magnetic field, and the half-battery or normal current transmitted by B' will be unable to attract it, so that in one complete revolution of the crank-handle e' all the escapement-wheels in the circuit will be locked by their pins at the unison-point. Now the transmitter B is operated by means of the crank-handle e. The first movement will cause contact between the tooth i of wheel c and spring g, causing the full power of battery C to be sent over the line D with sufficient power to attract armature r to its magnet F. This movement lifts pin P out of the unison-slot and moves the wheel L one step. Each successive movement of wheel d throws a tooth on that wheel into contact with spring j, and half the battery is sent over the line operating the step-by-step movement.

From this description it can be readily understood that a series of stations like A under control of a transmitter can be brought into correspondence and kept in unison with the transmitter by the increase or decrease of current sent from the central station. As soon as the zero-slot in any escapement-wheel arrives in conjunction with the pin P, it will of course be locked at unison and remain locked until tooth i is brought into contact with spring g, when the full power of battery C will lift all the pins out of the unison-slots at the same time and they will begin to revolve in unison with the transmitter B.

If desired, a disk secured to the shaft l, adjacent to escapement L, can carry the zero-slot and accomplish the same purpose as indicated in dotted lines in the drawings. In this construction, obviously, the prong n of armature M is to be bent out of the plane of the ratchet-wheel, so as to be in position to engage the notched disk placed beside the same. It will thus be understood that if in practice, prior to each operation of transmitter B, transmitter B' is completely revolved each station will have its escapement-wheel at the unison-point ready to start under control of transmitter B in unison with the transmitter, it being also understood that the crank of transmitter B is always to be left after each operation in such position that the first movement of the transmitter-handle e will place spring g in contact with tooth i. By this invention transmitter B' brings all the instruments on the line into unison with the transmitter B and locks them there, and all the instruments will then start from the unison-point together and in unison with the transmitter.

What I claim, and desire to secure by Letters Patent, is—

1. The combination of a step-by-step mechanism having a moving part formed with a unison-notch, a unison-stop normally resting in said notch and holding the step-by-step mechanism from movement when resting therein and until removed therefrom by an abnormal amount of power, a battery, a line, and an included magnet controlling said step-by-step mechanism, a unison-transmitter located in said line and connected at an intermediate point of the battery, so as to transmit a diminished amount of energy to said step-by-step mechanism, and a second transmitter located in the line connected with said battery controlling the full amount thereof, whereby the unison-stop will be dislodged from its notch by the full amount of current and the step-by-step mechanism operated by the normal current.

2. The combination of a step-by-step mechanism, a unison therefor holding said step-by-step mechanism from operation under normal currents when held at unison, a battery, a line-wire, and an included electro-magnet controlling said step-by-step mechanism, and a transmitter located in the line and connected to battery at more than two points and itself governing both the full and partial amount of battery thrown on said line.

3. In a unison device, the combination of step-by-step mechanism having a moving part provided with a unison-notch, a unison-stop for engaging the notch, an electro-magnet having an armature controlling the movements of the unison-stop, a battery, and a line connected therewith and including the said magnet, transmitting apparatus located in the line and controlling at will part or all of the battery-power transmitted to the magnet, the said armature having a range of movement such that when the armature is in full open position to close the unison-stop the diminished amount of current will not induce it but the full amount will, substantially as and for the purpose set forth.

4. In a unison device, the combination of step-by-step mechanism having a moving part provided with a unison-notch, an electro-magnet having a spring-retracted armature provided with a unison-stop for engaging the unison-notch, a battery and a connected line, including the said magnet, two transmitters located in the line, one controlling only a part of the battery and the other controlling both a part and all of the battery, the range of movement of the armature being such that when the armature is in full open position to close the unison-stop and part only of the battery is thrown on the line the armature will be out of inductive proximity to the magnet, substantially as and for the purpose set forth.

5. In a unison device having the armature of the operating-magnet out of inductive proximity thereto when in full open position and the diminished amount of current is thrown on the magnet and operated by the full amount of the current, substantially as described, two transmitters located in the line with the magnet, the one controlling only a part of the battery and the other both a part and all of the battery, substantially as and for the purpose set forth.

6. A combined step-by-step mechanism and unison consisting in an operating-magnet having a pivoted spring-retracted armature with a spring-pawl and a unison-stop, both mounted thereon, a rotary spindle provided with a ratchet-wheel, and a detent for the wheel, said ratchet operated step by step by the engaging-pawl of the armature under the vibrations of the latter, the rotating part of said mechanism provided with a unison-notch engaged by the unison-stop carried by the said armature, substantially as and for the purpose set forth.

7. The combination of the operating-magnet having a pivoted spring-retracted armature provided near one end with an adjustable unison-stop, a spring-pawl mounted on the armature near the end thereof bearing the stop, a ratchet-wheel having a detent and formed with a unison-notch engaged by the stop on the armature.

8. The combination of a ratchet-wheel, an operating-magnet having a pivoted spring-retracted armature provided with a forked end spanning the ratchet-wheel, and having a spring-pawl for engaging the ratchet and rotating it step by step under the vibrations of the armature, a detent for the ratchet, one prong of said forked armature provided with a unison stop for checking the movement of the ratchet, the other prong thereof provided with an adjusting-screw for regulating the throw of the magnet in its vibrations, substantially as and for the purpose set forth.

9. The combination of a step-by-step mechanism having a unison-stop for checking its movement, the electro-magnet F, controlling said mechanism and stop, battery C and line D, connected thereto, the transmitter B, consisting in shaft $a$, provided with contact-disk $b$ and break-wheels $c$ and $d$, the contact-finger $f$, engaging disk $b$ and in line D, the contact-finger $e$, engaging the break-wheel $c$ and in line D, the contact-finger $j$, connected to an intermediate point of battery C and engaging with break-wheel $d$, the transmitter B', consisting in the shaft $a'$, provided with contact-disk $b'$ and break-wheel $d'$, the contact-finger $f'$ in line D and engaging disk $b'$, and the contact-finger $j'$, engaging wheel $d'$ and connected to an intermediate point of the battery, as at point $k$, substantially as and for the purpose set forth.

10. The combination of the rotating spindle and ratchet-wheel, a detent for holding the parts from backward movement, the electro-magnet F, line D, battery C, and the transmitters B B', one controlling part and the other controlling both part and all of the battery, substantially as described, the pivoted spring-retracted armature M, provided with the unison-stop $p$ for taking in a unison-notch formed on the rotating part of the mechanism, and the spring-pawl $m$, mounted on the armature and engaging the ratchet-wheel, substantially as and for the purpose set forth.

11. The combination of the ratchet-wheel L, formed with a notch and provided with a detent to prevent backward movement of the ratchet, the operating-magnet F, having the pivoted spring-retracted armature M, formed with the prongs $n$ $n'$, the unison-stop $p$, mounted on the armature and adapted to engage the notch in the ratchet-wheel, and the spring-acted pawl $m$, engaging the teeth of the ratchet and advancing the wheel step by step under the vibrations of the armature, substantially as and for the purpose set forth.

GEO. F. OEHMEN.

Witnesses:
JOHN E. MCEWAN,
P. TILLINGHAST, Jr.